April 1, 1952 — W. G. BUTSCH — 2,591,050
ROOF FOR TRUCK BODIES
Filed Dec. 20, 1950 — 3 Sheets-Sheet 1
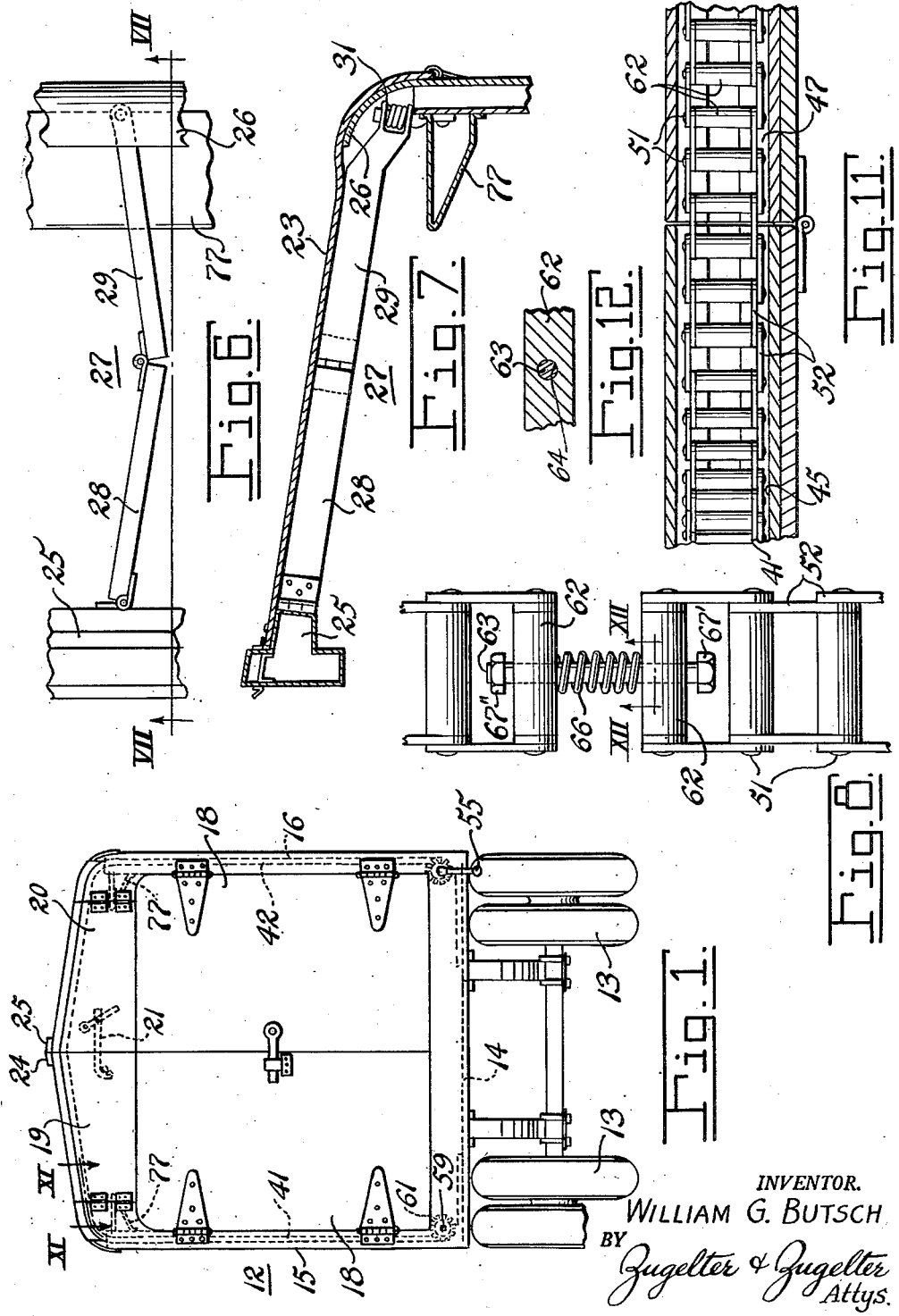
INVENTOR.
WILLIAM G. BUTSCH
BY Zugelter & Zugelter
Attys.

April 1, 1952 — W. G. BUTSCH — 2,591,050
ROOF FOR TRUCK BODIES
Filed Dec. 20, 1950 — 3 Sheets-Sheet 2
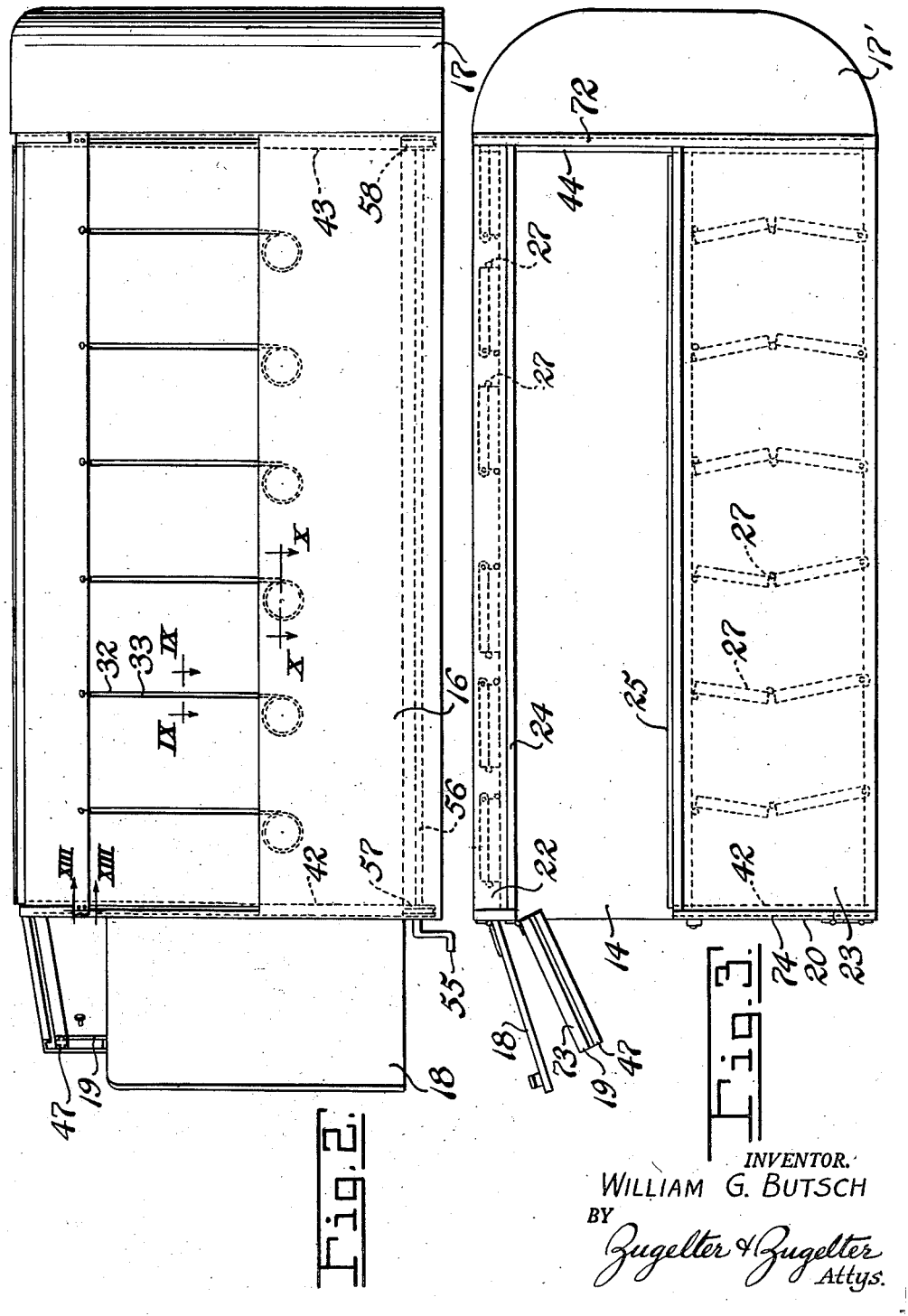
INVENTOR.
WILLIAM G. BUTSCH
BY Zugelter & Zugelter
Attys.

April 1, 1952
W. G. BUTSCH
2,591,050
ROOF FOR TRUCK BODIES
Filed Dec. 20, 1950
3 Sheets-Sheet 3
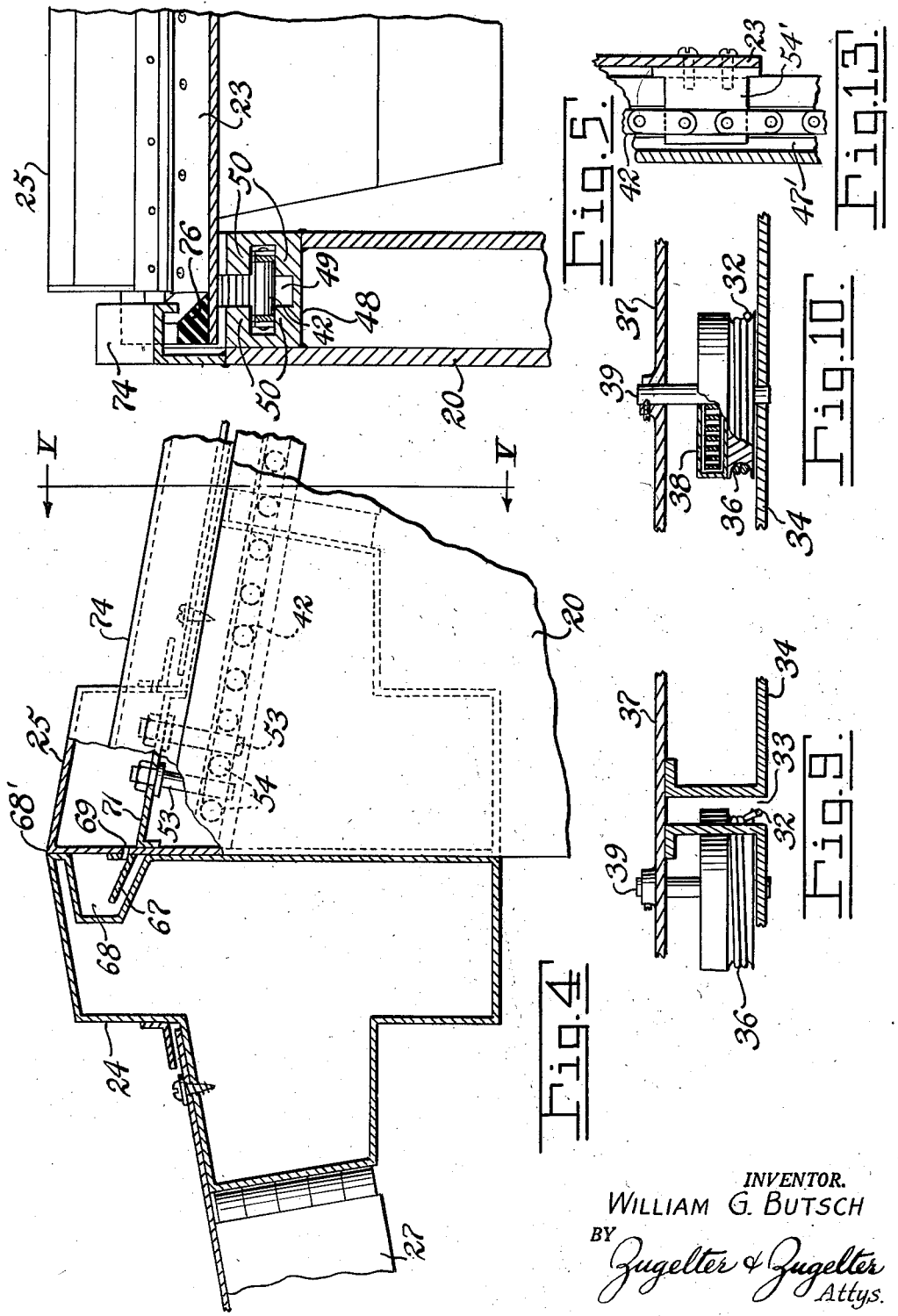
INVENTOR.
WILLIAM G. BUTSCH
BY Zugelter & Zugelter
Attys.

Patented Apr. 1, 1952

2,591,050

UNITED STATES PATENT OFFICE 2,591,050

ROOF FOR TRUCK BODIES

William G. Butsch, Fort Thomas, Ky.

Application December 20, 1950, Serial No. 201,768

6 Claims. (Cl. 296—100)

This invention relates to a truck or trailer-truck body having a top which can be opened and closed as required.

An object of this invention is to provide a top for a truck body which can readily and quickly be opened for ease in loading and unloading.

A further object of this invention is to provide a truck body with a top which can be opened or closed by mechanism that is operable from ground level.

A further object of this invention is to provide a truck body having a roof that lies along the side walls of the truck body when open.

A further object of this invention is to provide a top or roof which does not protrude outside the contour of the body when open.

A further object of this invention is to provide a truck body having a top and a rear panel either or both of which can be opened to facilitate loading and unloading.

A further object of this invention is to provide a truck body with a top which can be opened without folding or creasing the same.

The above and other objects and features of the invention will in part be apparent and will in part be obvious from the following detailed description, and the drawings, in which:

Figure 1 is a view in rear elevation showing a trailer-truck body having a top constructed in accordance with an embodiment of this invention;

Fig. 2 is a view in side elevation of the trailer-truck body with one rear door and rear panel open;

Fig. 3 is a top plan view of the trailer-truck body illustrated in Fig. 2;

Fig. 4 is an enlarged fragmentary view partly in rear elevation and partly in section, showing the ridge members of the roof, and the upper section of a door;

Fig. 5 is a view in section taken along a line V—V in Fig. 4;

Fig. 6 is an enlarged top plan view of one pair of toggle links which support the roof material;

Fig. 7 is a view in section taken along a line VII-VII in Fig. 6;

Fig. 8 is an enlarged fragmentary view of one of the chains employed in opening and closing the roof sections;

Fig. 9 is a fragmentary view in section taken along a line IX—IX in Fig. 2;

Fig. 10 is a fragmentary view in section taken along a line X—X in Fig. 2;

Fig. 11 is a view in section taken along a line XI—XI in Fig. 1;

Fig. 12 is a view in section taken along a line XII—XII in Fig. 8; and

Fig. 13 is an enlarged view in section taken on a line XIII-XIII in Fig. 2.

In the following detailed description, and the drawings, like reference characters indicate like parts.

As shown in Fig. 1, a trailer-truck body 12, mounted on wheels 13, includes a floor 14, side walls 15 and 16 and a front wall 17 (Figs. 2 and 3) which may be constructed in a conventional manner. A part of the front end of the trailer-truck body is covered by a short solid top 17'. At the rear of the body, rear doors 18 are hinged to side walls 15 and 16. The rear doors terminate below the top of the trailer body. Above the doors are located roof supporting panels 19 and 20. Panels 19 and 20 are hinged to the side walls and, when closed, meet at the center line of the trailer-truck body. A latch 21 of conventional form may be provided for holding panels 19 and 20 closed.

The roof of the trailer-truck body consists of a pair of sheets or sections 22 and 23 of flexible material. Inner edges of roof sheets 22 and 23 are attached to ridge members 24 and 25 respectively that form a split ridge pole. The members of the ridge pole extend the length of the body and can be actuated from open position in which they are adjacent and parallel to the side walls to a roof closed position in which the members 24 and 25 meet to form the ridge pole at the center line of the roof of the trailer-truck body. The roof sections 22 and 23 move with the ridge pole members.

The roof sections are made of a flexible material, such as by canvas, stainless steel, or other appropriate flexible material. The outer edge of each roof section extends over the top 26 of its associated side wall, as shown in Fig. 7. As the ridge members move away from the center line of the trailer-truck body, each roof section is guided around the top of the side wall associated therewith into alignment with the side wall. As shown in Fig. 7, upper edge or top 26 of each side wall of the trailer-truck body is curved inwardly to guide one of the roof sections.

The ridge pole members are supported by toggle frames 27 formed by toggle links 28 and 29. The toggle frames are connected to the ridge pole members and the sides of the truck body respectively as shown in Figs. 6 and 7. As the roof sections are closed, links 28 and 29 move toward alignment, while, as the roof sections are opened, links 28 and 29 move out of alignment and to the position shown in the upper section of Fig. 3 in which the links of each toggle frame attached to ridge member 24 nest against each other and adjacent side wall 15 of the trailer-truck body. Springs 31 (Fig. 7) mounted on the toggle hinges urge frames 27 in a direction to close the roof sections and to overcome the weight of the roof sections.

The roof sections are held taut by means of spring loaded cables 32. Details of the spring loading are shown in Figs. 9 and 10. Each of the cables 32 extends through a slot 33 in the outer wall 34 of the trailer-truck body. Each cable is attached to a drum 36 which is disposed between outer wall 34 and an inner wall 37. The drum is urged in cable tightening direction by an appropriate spring 38. One end of spring 38 is fixed to a shaft 39 which extends through the drum. The other end of the spring is attached to the drum. The drum turns on shaft 39. The spring is constructed to urge the drum in a direction to wind up the cable thereon so that at all times the roof sections are loaded and maintained taut, and, when the roof sections are lowered, the cables pull the roof sections down the side walls of the body.

The roof sections are raised and lowered by means of confined chains 41 and 42 (Figs. 2, 3, 4, and 5) disposed at the rear of the body, and similar chains 43, only one of which is shown, disposed at the front of the body. Chains 43 run in a chain way 44. Chain way 44 extends across solid top portion 17' and down the side walls of the body. Chain 41 runs in a chain way 45 (Fig. 11) in the left-hand side wall 15 of the body and, when the roof is closed, extends into chain way 47 in panel 19. Chain 42 runs in a similar chain way, 47' (Fig. 13), in the right-hand side wall and extends into a chain way 48 in panel 20 (Fig. 5) when roof section 23 is closed.

Chain way 47 is on the inside of panel 19 and adjacent the top thereof, as shown in Figs. 2 and 3. Chain way 48 (Fig. 5) is similarly attached to the inside of panel 20. Each chain way is slotted, as indicated at 49 in Fig. 5 to form tracks 50 for guiding one of the chains in which the chains are confined. As shown in Figs. 8 and 11, each chain is a sprocket chain made up of pins 51 and links 52 pivotally connecting adjacent pins. The chains run in the tracks, and, since movement of each chain is restricted by the tracks, each chain can be driven in either direction along the tracks by movement of one end of the chain.

As shown in Fig. 4, the upper and inner end of each chain is connected to one end of one of the ridge members by pins 53. Pins 53 are connected to and extend between the ridge member and terminal links 54 of the chain. The pins extend through the slot 49 in the chain way. Only the connection between the rear end of ridge member 25 and chain 42 is shown in detail, but it is to be understood that the connection between each chain and its associated ridge member may be similar. As the chains are advanced along the chain ways, the ridge members are moved toward or away from the center line of the trailer-truck body. In addition, the lower or outer corner of each roof section is connected to one of the chains. As shown in Fig. 13, chain 42 carries a plate 54'. Plate 54' extends through the slot in chain way 47' and is attached to one corner of roof section 23. As will be understood, the other chains are similarly attached to corners of the roof sections and each lower or outer corner of each roof section is connected to one of the chains.

As already pointed out, chain 41 can run in chain way 47, which is attached to roof supporting panel 19. When panel 19 is closed, chain way 47 communicates with chain way 45, which is in the left side wall 15 (Fig. 1) of the trailer-truck body, as shown most clearly in Fig. 11, and chain 41 can pass from chain way 45 into chain way 47. However, when the left-hand roof section is open, chain 41 moves out of chain way 47, and roof supporting panel 19 can be swung open, as shown in Fig. 2. The chain ways at the other side of the body are arranged in a similar fashion so that when the roof sections are both open, both rear roof supporting panels can be swung back and the top and rear end of the truck are fully open. Then, it is an easy matter to load or unload the body from above with the aid of a crane or the like.

The right-hand roof section 23 (Fig. 1) is opened and closed by means of a crank 55 (Figs. 1 and 2). Crank 55 is shown mounted on a shaft 56 (Fig. 2). Shaft 56 extends the length of the body and carries sprocket wheels 57 and 58 adjacent opposite ends thereof. Sprocket wheel 57 meshes with chain 42, and sprocket wheel 58 meshes with chain 43 so that when crank 55 is turned, chains 42 and 43 advance together. Crank 55 may be removably mounted on shaft 56 and may be removed and mounted on a shaft 59 (Fig. 1) at the other side of the trailer-truck body. Shaft 59 may be similar in construction to shaft 56 and carries sprockets wheels 61 (Fig. 1), only one of which is shown, which mesh with the chains on the left-hand side of the body.

Each of the chains may be provided with a spring link, as shown in Fig. 8. The spring link of each chain may be positioned in the portion of the chain housed in one of the side walls of the body and which does not pass over any of the sprocket wheels. The spring link includes two adjacent pins 62 which are connected by a bolt 63. Bolt 63 extends through bores 64 in the pins (see Fig. 12), and the pins slide along the bolt. A compression spring 66 mounted on the bolt urges pins 62 apart. When the section of the chain on one side of the spring link is urged toward the section on the other side, as when the roof section associated therewith is being closed, spring 66 is compressed. When the roof sections are fully closed, springs 66 resiliently hold the roof sections closed with roof members in engagement. On the other hand, when the chains are drawn outwardly and downwardly to open the roof sections, pins 62 bear on bolt head 67' and nut 67".

When the roof sections are closed, the ridge members abut along the center line of the trailer-truck body. As shown in Fig. 4, ridge member 25 is provided with an outwardly extending fin 67 that forms with the ridge member a gutter which extends into channel 68 in ridge member 24 when the roof sections are closed and provides a rain catcher along the center line of the truck body. Fin 67 slopes downwardly to the main portion of ridge member 25 and collects rain or other water which may enter between ridge members 24 and 25 at joint 68'. The water is drained from fin 67 through ports 69 onto a plate 71 which discharges water onto roof section 23.

A rain shield 72 (Fig. 3) is provided at the front of the roof sections and similar rain shields 73 and 74 are provided at the rear of the roof sections. Details of shield 74 are shown in Fig. 5.

Shield 74 is of inverted J-shape and is attached to the top of rear panel 20. Shield 74 overhangs an elongated baffle 76. Baffle 76 is attached to and moves with the rear edge of roof section 23. The baffle is formed of rubber or rubber-like material so that it can bend around the top of the side wall of the body as the roof sections are raised and lowered. Similar baffles are attached to the other front and rear edges of the roof sections, and the construction of all the rain shields may be similar to the construction of shield 74 so that an assembly of shield and baffle is provided at the front and rear edge of each roof section.

The vehicle body described above and shown in the drawings is designed as a trailer-truck. However, it is to be understood that the same type of body could be used on a self-propelled truck or other vehicle.

When both the roof sections are open, the interior of the body can be loaded or unloaded from above by means of a crane or the like. If desired, rear panels 19 and 20 may also be swung open for greater ease in loading and unloading. Bumpers 77 (Figs. 1 and 7) are provided at the tops of the side walls to protect ridge members 24 and 25 and collapsible frames 27 during loading and unloading.

The roof sections can be opened or closed without difficulty by one man standing at the rear of the body and without leaving the ground. If desired, sprocket carrying shafts 56 and 59 may readily be connected to an appropriate power take-off for power opening and closing.

The roof sections are never folded or creased during opening and closing but instead run smoothly over the side walls of the body.

When open, the roof sections do not project beyond the normal contours of the body so that the body fills the same space when open as when closed.

The trailer-truck body illustrated in the drawings and described above is subject to structural modification without departing from the spirit and scope of the appended claims.

Having described my invention, what I claim as new and desire to secure by Letters Patent is:

1. A truck body having a floor, side walls, a front wall and a rear wall and a roof, said roof comprising a plurality of extensible roof supporting frames each attached to the upper edge of one of the side walls and advanceable from a retracted position adjacent the side wall to an extended position in which the frames extend crosswise of the body spaced above the floor, a flexible sheet roof member connected to said frames and advanceable therewith from retracted position in which the top of the body is uncovered to extended position in which the roof member covers the top of the body, means for guiding the roof member into alignment with the sides of the body when retracted, and means for holding said roof member taut.

2. A truck body which comprises a floor, side walls, a front wall, a plurality of extensible roof supporting frames attached to the upper edge of each of the side walls, inner ends of the frames attached to each side wall being connected by a ridge member, said ridge members and frames being advanceable from a retracted position adjacent the side walls to an extended position in which the ridge members substantially abut and the frame members span the top of the body, flexible sheet roof members attached to the ridge members and advanceable therewith from retracted position in which the top of the body is uncovered to extended position in which the roof members cover the top of the body, a rear frame extending between rear ends of the side walls adjacent the tops thereof, open topped chain ways in the top of the front wall and of the rear frame, compression loadable chains in said chain ways, each of said ridge members being attached to one of said chains at each end thereof, means for guiding the roof panels into alignment with the sides of the body when retracted, means for holding said roof members taut and for drawing the roof members down the sides of the body when retracted, and means for advancing the chains in the chain ways to advance the ridge and roof members from retracted to extended positions.

3. A truck body which comprises a floor, side walls, a front wall, a plurality of extensible roof supporting frames attached to the upper edge of each of the side walls, inner ends of the frames attached to each side wall being connected by a ridge member, said ridge members and frames being advanceable from a retracted position adjacent the side walls to an extended position in which the ridge members substantially abut and the frame members span the top of the body, flexible sheet roof members attached to the ridge members and advanceable therewith from retracted position in which the top of the body is uncovered to extended position in which the roof members cover the top of the body, a rear frame extending between rear ends of the side walls adjacent the tops thereof, the rear frame comprising two sections, each of said sections being hinged to one of the side walls, the sections meeting at the center line of the vehicle body, open-topped chain ways in the top of the front wall and of the rear frame, each section of the rear frame carrying the ways for one of the chains, compression loadable chains in said chain ways, each of said ridge members being attached to one of said chains at each end thereof, means for guiding the roof panels into alignment with the sides of the body when retracted, means for holding said roof members taut and for drawing the roof members down the sides of the body when retracted, and means for advancing the chains in the chain ways to advance the ridge and roof members from retracted to extended positions, the chains being out of the chain ways in the sections of the rear frame when the roof members are retracted, said sections being adapted to swing open when the roof members are retracted, whereby the top of the truck body is unobstructed.

4. A truck body which comprises a floor, side walls, a front wall, a plurality of extensible roof supporting frames attached to the upper edge of each of the side walls, inner ends of the frames attached to each side wall being connected by a ridge member, said ridge members and frames being advanceable from a retracted position adjacent the side walls to an extended position in which the ridge members substantially abut and the frame members span the top of the body, flexible sheet roof members attached to the ridge members and advanceable therewith from retracted position in which the top of the body is uncovered to extended position in which the roof members cover the top of the body, the ridge members interlocking when the frames and ridge members are in extended position to prevent entry of rain between the roof members, a rear frame extending between rear ends of the side walls adjacent the tops thereof, open topped chain ways in the top of the front wall and of the rear frame, compression loadable chains in said chain ways, each of said ridge members being attached to one of said chains at each end thereof, means for guiding the roof panels into alignment with the sides of the body when retracted, means for holding said roof members taut and for drawing the roof members down the sides of the body when retracted, and means for advancing the chains in the chain ways to advance the ridge and roof members from retracted to extended positions.

5. A truck body which comprises a floor, side walls, a front wall, a plurality of extensible roof supporting frames attached to the upper edge of each of the side walls, inner ends of the frames attached to each side wall being connected by a ridge member, said ridge members and frames being advanceable from a retracted position adjacent the side walls to an extended position in which the ridge members substantially abut and the frame members span the top of the body, spring means urging the frame members toward extended position, flexible sheet roof members attached to the ridge members and advanceable therewith from retracted position in which the top of the body is uncovered to extended position in which the roof members cover the top of the body, a rear frame extending between rear ends of the side walls adjacent the tops thereof, open topped chain ways in the top of the front wall and of the rear frame, compression loadable chains in said chain ways, each of said ridge members being attached to one of said chains at each end thereof, means for guiding the roof panels into alignment with the sides of the body when retracted, means for holding said roof members taut and for drawing the roof members down the sides of the body when retracted, and means for advancing the chains in the chain ways to advance the ridge and roof members from retracted to extended positions.

6. A truck body which comprises a floor, side walls, a front wall, a plurality of extensible roof supporting frames attached to the upper edge of each of the side walls, inner ends of the frames attached to each side wall being connected by a ridge member, said ridge members and frames being advanceable from a retracted position adjacent the side walls to an extended position in which the ridge members substantially abut and the frame members span the top of the body, flexible sheet roof members attached to the ridge members and advanceable therewith from retracted position in which the top of the body is uncovered to extended position in which the roof members cover the top of the body, a rear frame extending between rear ends of the side walls adjacent the tops thereof, open topped chain ways in the top of the front wall and of the rear frame, compression loadable chains in said chain ways, each of said ridge members being attached to one of said chains at each end thereof, means for guiding the roof panels into alignment with the sides of the body when retracted, means for holding said roof members taut and for drawing the roof members down the sides of the body when retracted, a sprocket wheel in mesh with each of said chains, a shaft connecting the sprocket wheels which mesh with the chains attached to each ridge member, and means for turning each of said shafts, whereby both ends of each ridge member are advanced and retracted together between retracted and extended positions.

WILLIAM G. BUTSCH.

REFERENCES CITED

The following references are of record in the file of this patent:

UNITED STATES PATENTS

| Number | Name | Date |
|---|---|---|
| 296,810 | Wyman | Apr. 15, 1884 |
| 1,231,874 | Gallanore et al. | July 3, 1917 |
| 1,318,820 | Watkins | Oct. 14, 1919 |

FOREIGN PATENTS

| Number | Country | Date |
|---|---|---|
| 486,120 | Great Britain | May 31, 1938 |